US006612466B1

United States Patent
Malin

(10) Patent No.: US 6,612,466 B1
(45) Date of Patent: Sep. 2, 2003

(54) THIN WALL FITMENT FOR SPOUTED POUCH

(75) Inventor: Art Malin, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 121 days.

(21) Appl. No.: 09/643,033

(22) Filed: Aug. 21, 2000

(51) Int. Cl.$^7$ .............................................. B65D 35/08
(52) U.S. Cl. ...................................... 222/107; 222/572
(58) Field of Search ............................... 222/107, 572; 383/906, 80

(56) References Cited

U.S. PATENT DOCUMENTS

| | | |
|---|---|---|
| 3,690,524 A | 9/1972 | Haberhauer |
| 3,765,144 A | 10/1973 | Schiesser |
| 3,894,381 A | 7/1975 | Christine et al. |
| 4,076,147 A | 2/1978 | Schmit |
| 4,126,167 A * | 11/1978 | Smith et al. ............... 383/80 |
| 4,165,023 A | 8/1979 | Schmit |
| 4,529,108 A | 7/1985 | Chlystun |
| 4,561,110 A | 12/1985 | Herbert |
| 4,619,797 A | 10/1986 | Chlystun |
| 4,813,578 A | 3/1989 | Gordon |
| 4,909,434 A | 3/1990 | Jones |
| 5,429,699 A | 7/1995 | Abrams |
| 5,467,581 A | 11/1995 | Everette |
| 5,690,764 A | 11/1997 | Dirksing |
| 5,716,471 A | 2/1998 | Pape |
| 5,851,072 A | 12/1998 | LaFleur |
| 5,911,340 A | 6/1999 | Uematsu |
| 6,000,848 A | 12/1999 | Massioui |
| 6,050,451 A | 4/2000 | Hess, III et al. |
| 6,066,081 A | 5/2000 | Bachner |

FOREIGN PATENT DOCUMENTS

| | | |
|---|---|---|
| DE | 196 17 024 A1 | 11/1997 |
| JP | 5-229566 | 9/1993 |
| WO | WO 96/21599 | 7/1996 |

* cited by examiner

*Primary Examiner*—Philippe Derakshani
(74) *Attorney, Agent, or Firm*—Pitney, Hardin, Kipp & Szuch LLP

(57) ABSTRACT

A fitment has walls with a spout aperture therebetween. Reduced wall thickness results in a reduced amount of plastic in the fitment. An alternative embodiment uses radially extending meltable fins. During installation in a sealing apparatus, a heated mandrel engages the inner diameter of the spout aperture thereby pre-heating and physically supporting the fitment during the installation process. The heated mandrel typically engages the fitment at least one cycle prior to be installed. The fitment may be canoe-shaped.

6 Claims, 4 Drawing Sheets

THIN WALL FITMENT FOR SPOUTED POUCH

BACKGROUND OF THE INVENTION

1. Field of the Invention

This invention pertains to a fitment for a spouted pouch, particularly one with a canoe-type base or meltable fin wherein the plastic is reduced in transition areas and in the wall thickness of the base. To accelerate and maintain the integrity of the process for installing a fitment, a heated mandrel shaped and sized to the inner diameter of the fitment passageway is used.

2. Description of the Prior Art

In the prior art, it is known to use a fitment/spout with a canoe shaped base with extended meltable fins oriented 180° apart, and multiple horizontal ribs spaced evenly across the height of the canoe. The canoe shape and the meltable fins assure gradual transition from the two plies of film (one on each side of the fitment) to the maximum width of the canoe in the diametrical center of the fitment.

In order to seal or weld the fitments to the film at the fastest possible rate, and to reduce potential leaking at the base, the base can be made with horizontal.ribs to increase the sealing pressure and to reduce the dwell time. However, the sealing pressure must not damage or misshape the inner diameter of the fitment. To avoid such problems, the canoe base is typically made more massive than would otherwise be required.

Because the maximum temperature of the jaws is limited by the characteristics of the film, the two driving variables of the sealing equation become the dwell time and the pressure. That is, a canoe base which is enlarged for the above reasons requires increased dwell time and pressure to bring it to the sealing temperature, which is counterproductive to the production rates of the fitment attachment process.

The attachment of this kind of fitment is disclosed in U.S. patent application Ser. No. 09/452,714 entitled "Method for Attaching Fitment at Longitudinal Fin Seal and Package Resulting Therefrom" filed on Dec. 2, 1999.

Other prior art includes U.S. Pat. No. 5,911,340 entitled "Spout Assembly, Spout Assembly Manufacturing Apparatus and Package with Spout Asssembly" issued on Jun. 15, 1999 to Uematsu; U.S. Pat. No. 5,716,471 entitled "Method for Securing Articles to Laminates" issued on Feb. 10, 1998 to Pape; U.S. Pat. No. 4,909,434 entitled "Moisture Impervious Carton Having One-Piece Pouring Spout Sealed to Innermost and Outermost Surfaces" issued on Mar. 20, 1990 to Jones et al.; and U.S. Pat. No. 3,894,381 entitled "Method and Means for Attaching Fitments to a Bag or Pouch on a Packaging Machine" issued on Jul. 15, 1975 to Christine et al.

OBJECTS AND SUMMARY OF THE INVENTION

It is therefore an object of the present invention to provide a fitment with canoe-shaped walls which can be installed between two plies of plastic film with reduced dwell time and/or reduced jaw pressure.

It is therefore a further object of the present invention to provide a fitment with canoe-shaped walls which can be installed at high speeds.

It is therefore a still further object of the present invention to provide a fitment with canoe-shaped walls which can reliably maintain its shape during installation.

These and other objects are attained by providing an injection molded fitment with reduced-plastic in the canoe base, to retain the shape and length of the canoe, but to reduce the amount of plastic in transition areas and in the wall thickness of the base. This reduces the mass of the canoe and the required preheat/sealing dwell time. An alternative embodiment employs radially extending meltable fins in place of the canoe base. In order to compensate for the reduction in the rigidity of the base and the resulting reduction in ability to withstand the pressure of the sealing bars, the fitment is installed with a heated mandrel inserted through the inner diameter of the fitment. More specifically, as the fitment travels along the track from the vibratory bowl to the sealing station, a heated mandrel shaped and sized to the inner diameter of the fitment is inserted into the inner diameter of the fitment. In order to avoid unnecessary softening of the fitment, the temperature of the mandrel is typically 20–30° F. below the softening temperature of the resin from which the fitment is molded. In order to heat the fitment thoroughly from the inside prior to installation without slowing down the installation process, the mandrel is typically inserted at least one cycle away from the sealing position. The insertion of the heated mandrel into the inside diameter of the fitment will further prevent the collapse or misshaping of the base. Indeed, the sealing dwell time is thereby reduced by both the reduction of plastic in the base and the heating of the fitment by the mandrel.

BRIEF DESCRIPTION OF THE DRAWINGS

Further objects and advantages of the invention will become apparent from the following description and claims and from the accompanying drawings, wherein:

DETAILED DESCRIPTION OF THE PREFERRED EMBODIMENT

Figure 1:
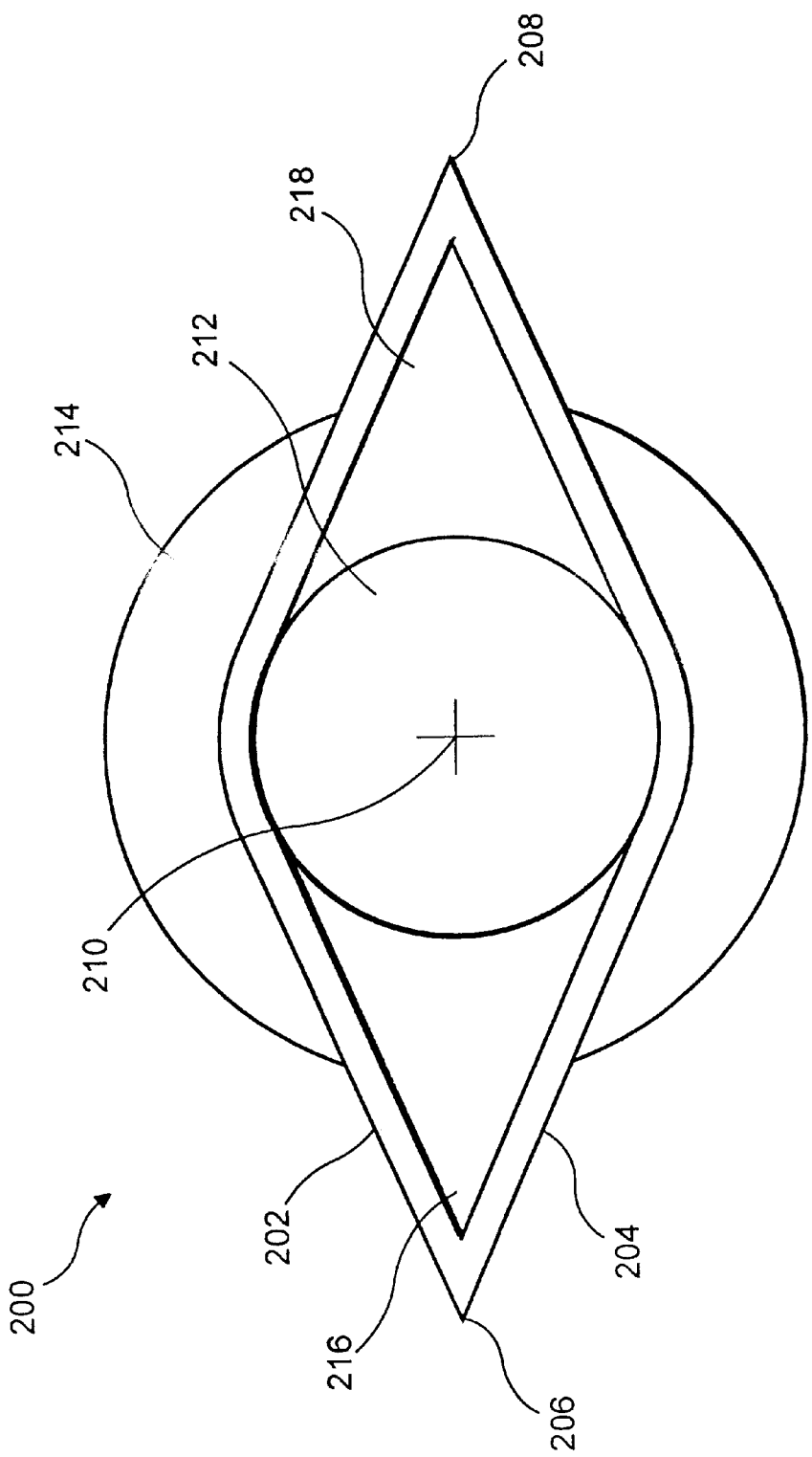
FIG. 1 is a top plan view of a typical prior art fitment.

Referring now to the drawings in detail wherein like numerals refer to like elements throughout the several views, one sees that FIG. 1 is a top plan view of a prior art fitment 200. Fitment 200 includes canoe-shaped walls 202, 204 which join to form pointed ends 206, 208. The shape of walls 202, 204 and pointed ends 206, 208 allows for a gradual transition from the two plies of film (not shown, but which are sealed to walls 202, 204) to the maximum.width of the canoe in the diametrical center 210 of the fitment 200, wherein spout aperture 212 is formed. Spout aperture 212 passes through a stem (not shown) which typically includes an externally threaded structure and a cylindrical flange 214 and further forms spout walls to allow the dispensing of liquid or near-liquid product from a container formed by two plastic sheets.sealed to.walls 202, 204. While not shown in FIG. 1, walls 202, 204 may include a ribbed structure, with ribs.extending from pointed end 206 to pointed end 208.

Fitment 10 is typically molded from polyethylene or polypropylene plastic, although those skilled in the art may recognize that other equivalents are available.

Figure 2:
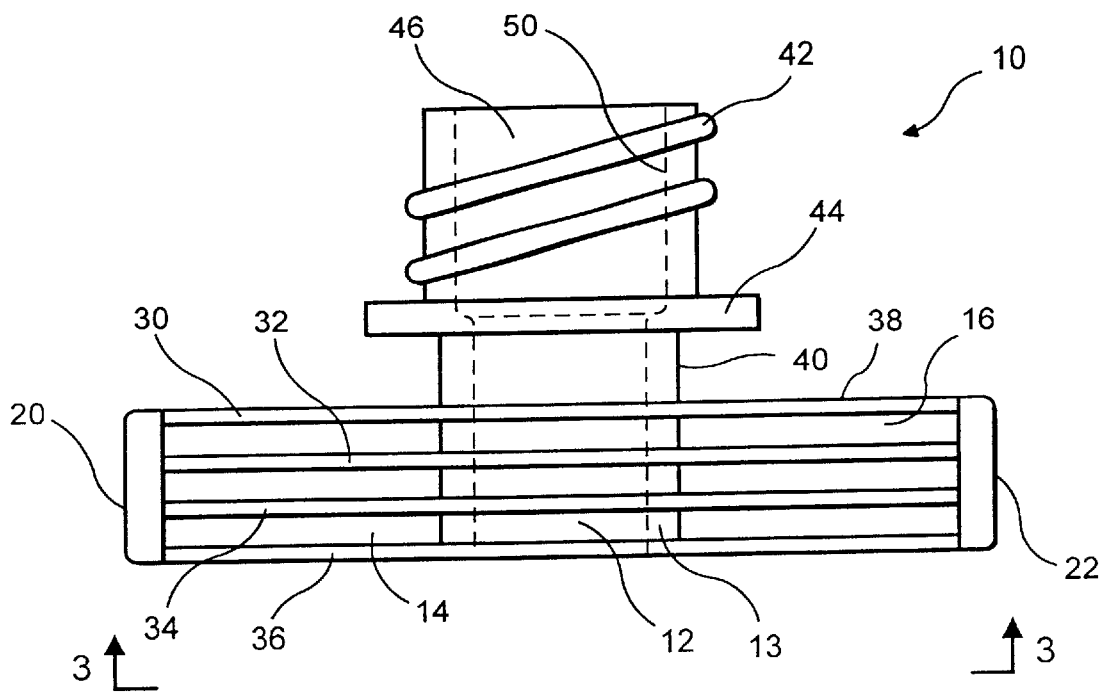
FIG. 2 is a side view partially in phantom of the fitment of the present invention.

Fitment 10 of the present invention, as shown in FIG. 2, is envisioned to have an aperture area wall 13 with a thickness in the range of 0.020 inches, as compared to a typical prior art value in the range of 0.035 to 0.040 inches. Similarly, fitment 10 is envisioned to have vertical support walls 14, 16 with a thickness in the range of 0.015 to 0.025 inches rather than the typical prior art value of 0.035 to 0.040 inches and sealing ribs 30,32,34,36 which are 0.025 to 0.030 inches wide rather than the typical prior art value of 0.040 to 0.050 inches. Again, this reduced material allows fitment 10 to be installed with a reduced sealing dwell time.

Figure 3:
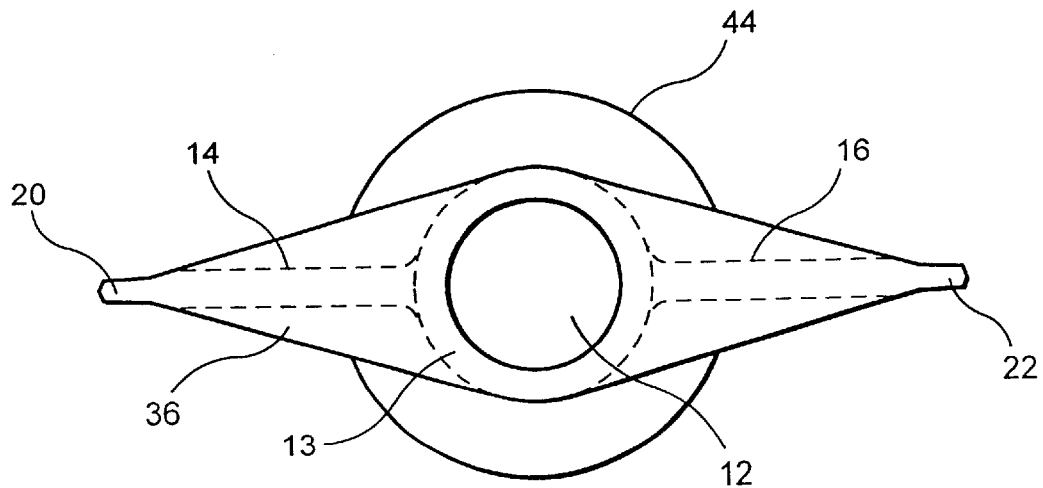
FIG. 3 is a top plan view of the fitment of the present invention.

As shown in FIG. 2, canoe wall 16 (as well as canoe wall 14) includes ribs 30, 32, 34, 36 extending between pointed ends 20, 22. Stem 40 extends from upper wall 38 and includes external threads 42 and cylindrical stop 44 which interact with an internally threaded cap (not shown) to seal mouth 46 of spout aperture 12 which is formed at the top of stem 40. As shown in FIG. 3, aperture 12 can include an enlarged diameter area 50 proximate to mouth 46 and inwardly from external threads 42.

Figure 6:
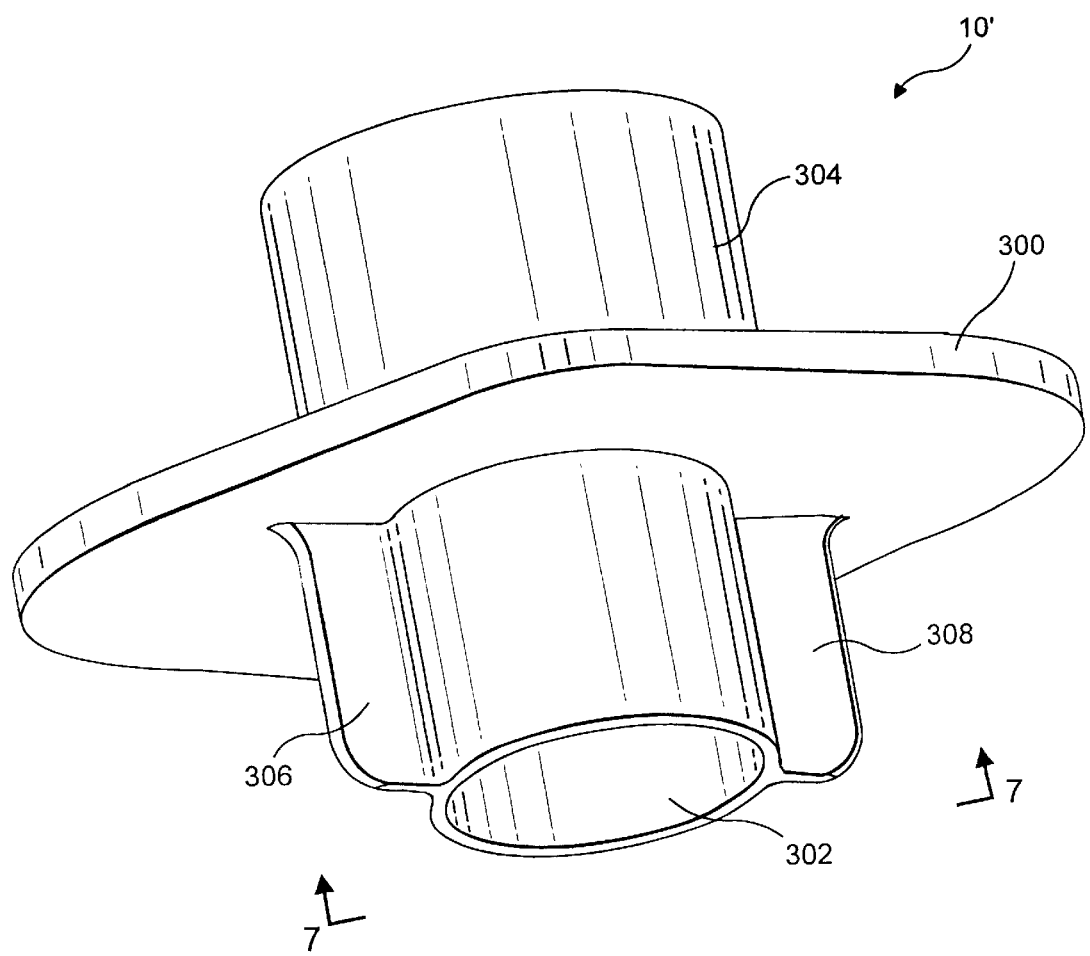
FIG. 6 is a perspective view of an alternative embodiment of the present invention wherein meltable fins are substituted for the canoe-shaped base.
Figure 7:
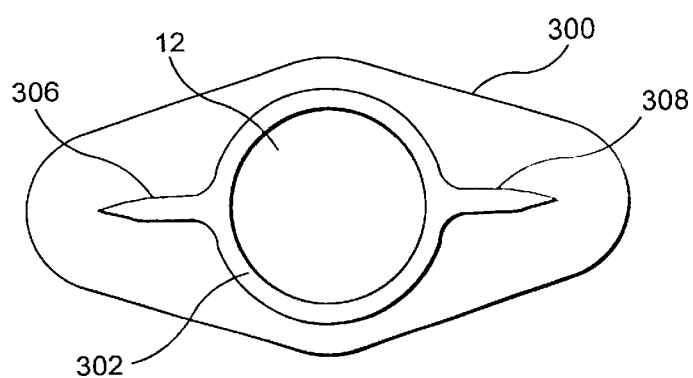
FIG. 7 is a top plan view of the embodiment of FIG. 6.

Fitment 10', an alternative embodiment of the present invention, is illustrated in FIG. 6. A retaining ring 300 serves as a support for cylindrical skirt 302 on the underside and spout 304 on the upper side. Aperture 12, similar to aperture 12 illustrated in previous drawings herein, passes through cylindrical skirt 302 and spout 304. Meltable fins 306, 308 extend radially from cylindrical skirt 302.

Figure 4:
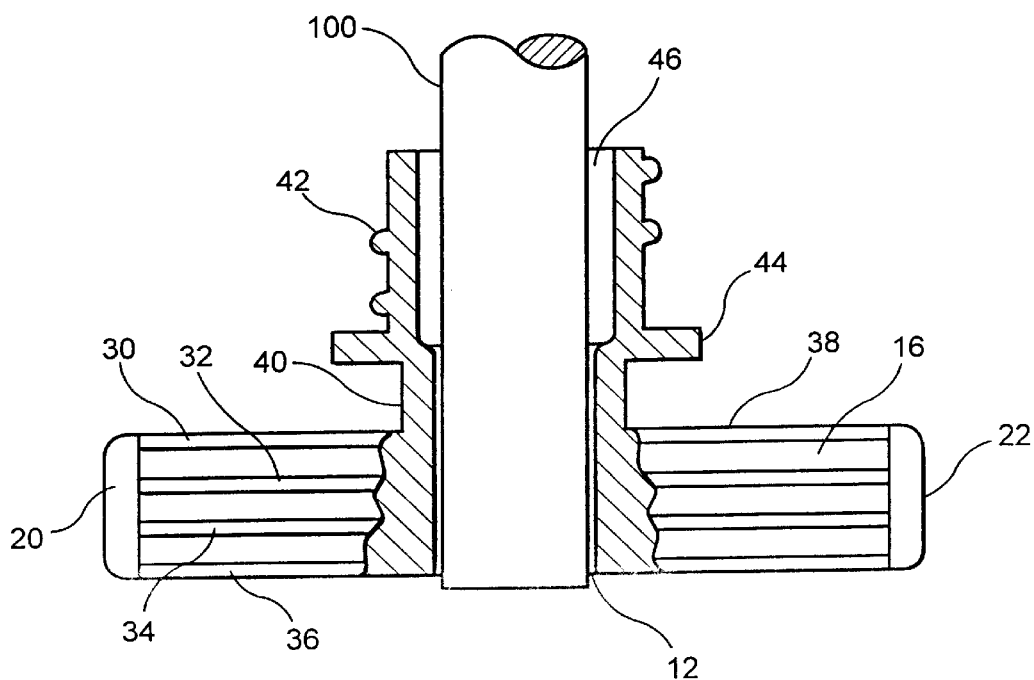
FIG. 4 is a side plan view, partially in cross-section, of the fitment of the present invention, shown with the heated mandrel inserted through the inner diameter thereof.

FIG. 4 illustrates heated mandrel 100 inserted through aperture 12 during the installation process. Mandrel 100 is typically heated to 20–30° F. below the softening point of the resin.

Figure 5:
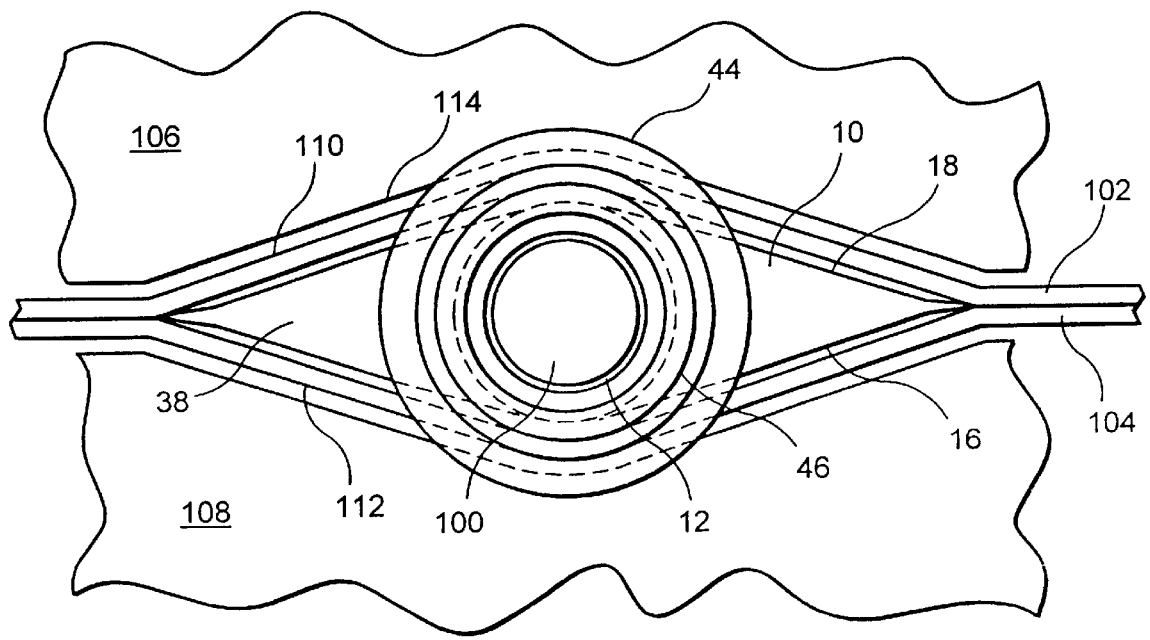
FIG. 5 is a top view of the fitment of the present invention as it is being sealed to the film panels.

FIG. 5 illustrates the sealing of the 100, 104 of plastic film to canoe walls 16, 18 of fitment 10 by sealing jaws 106, 108 of a fitments to film sealing apparatus 110. Sealing jaws 106, 108 are heated to perform the sealing operation and have opposing recesses 110, 112 which form cavity 114 which is complementary in shape to fitment 10 (See FIGS. 2, 3 or 6).

Thus the several aforementioned objects and advantages are most effectively attained. Although a preferred embodiment of the invention has been disclosed and described in detail herein, it should be understood that this invention is in no sense limited thereby and its scope is to be determined by that of the appended claims.

What is claimed is:

1. A spout assembly including:

a spout aperture bounded by a cylindrical wall extending through the spout assembly;

a first wall and a second wall supporting multiple horizontal sealing ribs and extending away from the cylindrical wall of the aperture, said first and second walls and ribs forming an area through which said spout aperture passes; and wherein substantially all of said first wall, substantially all of said second wall and substantially all of said cylindrical wall have a thickness less than 0.035 inches.

2. The spout assembly of claim 1 wherein said first wall, said second wall and said cylindrical wall have a thickness substantially equal to 0.020 inches.

3. The spout assembly of claim 2 wherein ribs are formed on said first and second walls and across the cylindrical wall of the aperture which are substantially perpendicular to a longitudinal axis of said spout aperture.

4. The spout assembly of claim 3 wherein said first and second walls and horizontal ribs form a canoe-shaped profile.

5. A spout assembly with cylindrical walls and meltable fins extending radially from said cylindrical walls, wherein substantially all of said cylindrical walls are less than 0.035 inches thick.

6. The spout assembly of claim 5 wherein said cylindrical walls are approximately 0.020 inches thick.

* * * * *